United States Patent [19]

Pflueger et al.

[11] Patent Number: 5,296,770

[45] Date of Patent: Mar. 22, 1994

[54] ELECTRIC MACHINE, PREFERABLY ROTARY CURRENT GENERATOR FOR VEHICLES

[75] Inventors: Gerhard Pflueger, Markgroeningen; Bernhard Fakler, Esslingen; Susanne Klaus, Stuttgart; Klaus-Georg Buerger, Markgroeningen, all of Fed. Rep. of Germany

[73] Assignee: Robert Bosch GmbH, Stuttgart, Fed. Rep. of Germany

[21] Appl. No.: 934,683

[22] PCT Filed: Apr. 26, 1991

[86] PCT No.: PCT/DE91/00351

§ 371 Date: Sep. 4, 1992

§ 102(e) Date: Sep. 4, 1992

[87] PCT Pub. No.: WO91/20119

PCT Pub. Date: Dec. 26, 1991

[30] Foreign Application Priority Data

Jun. 12, 1990 [DE] Fed. Rep. of Germany ....... 4018710

[51] Int. Cl.[5] ............................................ H02K 16/00
[52] U.S. Cl. .................................... 310/14; 310/68 D; 310/71
[58] Field of Search ................... 310/67 R, 68 D, 71, 310/89, 90, 91, 112, 114, 115, 254, 257, 261, 263

[56] References Cited

U.S. PATENT DOCUMENTS

| 3,793,544 | 2/1974 | Baumgartner et al. | 320/17 |
|---|---|---|---|
| 4,221,982 | 9/1980 | Raver et al. | 310/68 D |
| 4,262,224 | 4/1981 | Kofink et al. | 310/254 |
| 4,546,280 | 10/1985 | Plueger | 310/71 |
| 4,705,983 | 11/1987 | Franz et al. | 310/89 |
| 4,980,588 | 12/1990 | Ogawa | 310/68 D |

FOREIGN PATENT DOCUMENTS

| 0062706 | 10/1982 | European Pat. Off. | 310/114 |
|---|---|---|---|
| 1903175 | 4/1969 | Fed. Rep. of Germany | 310/114 |
| 2613553 | 7/1988 | France | 310/68 D |
| 2629287 | 9/1989 | France | 310/71 |

OTHER PUBLICATIONS

Patent Abstracts of Japan A-62 189942 (Mitsubishi) Aug. 19, 1987.
WOo A 8902161 (Robert Bosch) Mar. 9, 1989.

*Primary Examiner*—Steven L. Stephan
*Assistant Examiner*—Matthew Nguyen
*Attorney, Agent, or Firm*—Michael J. Striker

[57] ABSTRACT

The electric machine, preferably a three-phase generator (10) for vehicles with a liquid-cooled, pot-shaped metal housing (20) includes two three-phase systems arranged in the house and situated one after the other in the axial direction, a drive shaft (13) received in the base of the metal housing on one end and in a bearing cover (18) on the drive end. For a compact connection of the two three-phase systems and exciter systems with rectifier units and regulators the electrical connections of the three-phase and exciter windings (31, 32; 14, 15) are received in the bearing cover (18) so that they are electrically connected with positive and negative diodes (44, 45) of the rectifier units arranged externally on the bearing cover (18) and with the regulators and connection terminals (22) of the machine via printed circuit boards (65, 80). The negative diodes are pressed into the bearing cover (18) and the positive diodes (45) are pressed into positive heat sinks (60), which are fastened externally to the bearing cover (18) so as to be thermally conductive and electrically insulated. For protection against dirt, moisture and the like and for the electrical connection the winding connections, the rectifier units and regulators are covered by at least one of the printed circuit boards (65, 80) fastened to the cover (18).

14 Claims, 4 Drawing Sheets

5,296,770

ELECTRIC MACHINE, PREFERABLY ROTARY CURRENT GENERATOR FOR VEHICLES

BACKGROUND OF THE INVENTION

The invention relates to an electric machine, preferably a three-phase generator for vehicles.

An electric machine for vehicles is known having a plurality of connection terminals; a liquid-cooled, pot-shaped metal housing; a bearing cover closing the pot-shaped housing on the drive side; a drive shaft supported at one end thereof in the base of the pot-shaped housing and on another end in the bearing cover; two stator plate stacks spaced from each other axially in the pot-shaped metal housing; two three-phase windings, each of the three-phase windings having an exciter winding, the three-phase windings being inserted in slots of the stator plate stacks; two circumferentially extending claw pole rotors fastened to the drive shaft; rectifier units comprising negative and positive diodes; and regulator means.

A three-phase generator for motor vehicles having a double-generator system in a closed, liquid-cooled housing is already known from DE-OS 31 28 081 (FIG. 5), in which the drive shaft is mounted at each end in an end cover. It is further known from DE-OS 31 28 081 to locate the rectifier with the regulator means and connection terminals at the rear end cover, on the so-called B-side of the generator, and the V-belt pulley at the front end of the drive shaft on the so-called A-side.

This type of structure is not possible in electric machines which are inserted directly into a pot-shaped recess of the drive unit of a motor vehicle for cooling. The B-side of the three-phase generator is no longer accessible from the outside so that terminals can no longer be made there.

In this latter case a pot-shaped metal housing is used for the three-phase generator and the terminals or electrical connections are located at the bearing cover on the A-side of the generator. However, it is then very costly to attach and connect the rectifier units and regulator switches for the three-phase generator separately.

SUMMARY OF THE INVENTION

It is an object of the present invention to provide an electric machine in which the rectifier units and regulator circuit means are arranged as compactly as possible and jointly with the connection terminals in surface-cooled electric machines with two three-phase generator systems arranged axially one after the other.

According to the invention, the electric machine comprises a plurality of connection terminals; a pot-shaped metal housing having a base; a bearing cover closing the pot-shaped housing on the drive side; a drive shaft supported at one end thereof in the base of the pot-shaped housing and on another end in the bearing cover; two stator plate stacks spaced rom each other axially in the pot-shaped metal housing, the stator plate stacks each being provided with a slot; two three-phase windings, each of the three-phase windings having an exciter winding, the three-phase windings being inserted in the slots of the stator plate stacks, the three-phase windings and the exciter windings having electrical connection means received in the bearing cover; two circumferentially extending claw pole rotors fastened to the drive shaft; rectifier units comprising negative and positive diodes in the bearing cover; and regulator means on the bearing cover. The electrical connection means of the exciter and three-phase windings are electrically connected with the rectifier units, connection terminals and the regulator means on the bearing cover.

The electric machine according to the invention has the advantage that the regulator circuit means rectifier units and liquid-cooled three-phase generator with pot-shaped housing can be produced and sold as a complete unit for installation in a drive unit or the like. A further advantage consists in that the heat losses generated in the rectifier units and regulator circuit means can be transmitted to the liquid cooled means via the bearing cover so as to achieve a compact construction.

There are several advantageous embodiments of the invention.

In a preferred embodiment of the invention a thermally conductive and electrically insulating positive heat sink can be provided fastened to the bearing cover, while the negative diodes of the rectifier units can be pressed into the bearing cover and the positive diodes can be pressed into the positive heat sink. The machine can also have at least one printed circuit board fastened to the bearing cover so as to cover the negative diodes, the positive diodes and the positive heat sink externally. The printed circuit board or boards have conductor paths and make electrical connection with the electrical connection means of the three-phase windings and the exciter windings, with the connection terminals and with the regulator means.

Advantageously the electrical connection means of each of the three-phase windings is arranged on one of the rectifier units which are separated from each other electrically. The electrical connection means of each of the exciter windings can be arranged at one of the regulator means on the bearing cover and are separated from each other electrically. The connection terminals are electrically separated from each other and the bearing cover is provided with bore holes to receive the negative diodes and the positive heat sinks are provided with bore holes to receive the positive diodes.

The electric machine can also include a heat conducting plastic enclosing the three-phase windings and two groups of threaded bushings in collars of the heat conducting plastic, each of the collars being engaged in a recess of the bearing cover and the electrical connection means of the two three-phase windings being combined in the two groups of threaded bushings.

A thermally conducting and electrically insulating cooling plate can be provided on the bearing cover for each of the two regulator means, and each of the regulator means can be located adjacent a rectifier unit mounted on one of the cooling plates. A connection plate having threaded bolts for each of the electrical connection means of the exciter windings and made of insulating material can be provided. The connection plate can be fastened to the bearing cover between the two cooling plates and the threaded bolts electrically connected via the conductor paths of the printed circuit board with the regulator means.

BRIEF DESCRIPTION OF THE DRAWINGS

The objects, features and advantages of the present invention will now be illustrated in more detail by the following detailed description, reference being made to the accompanying drawing in which.

DETAILED DESCRIPTION OF THE PREFERRED EMBODIMENT

Figure 1:
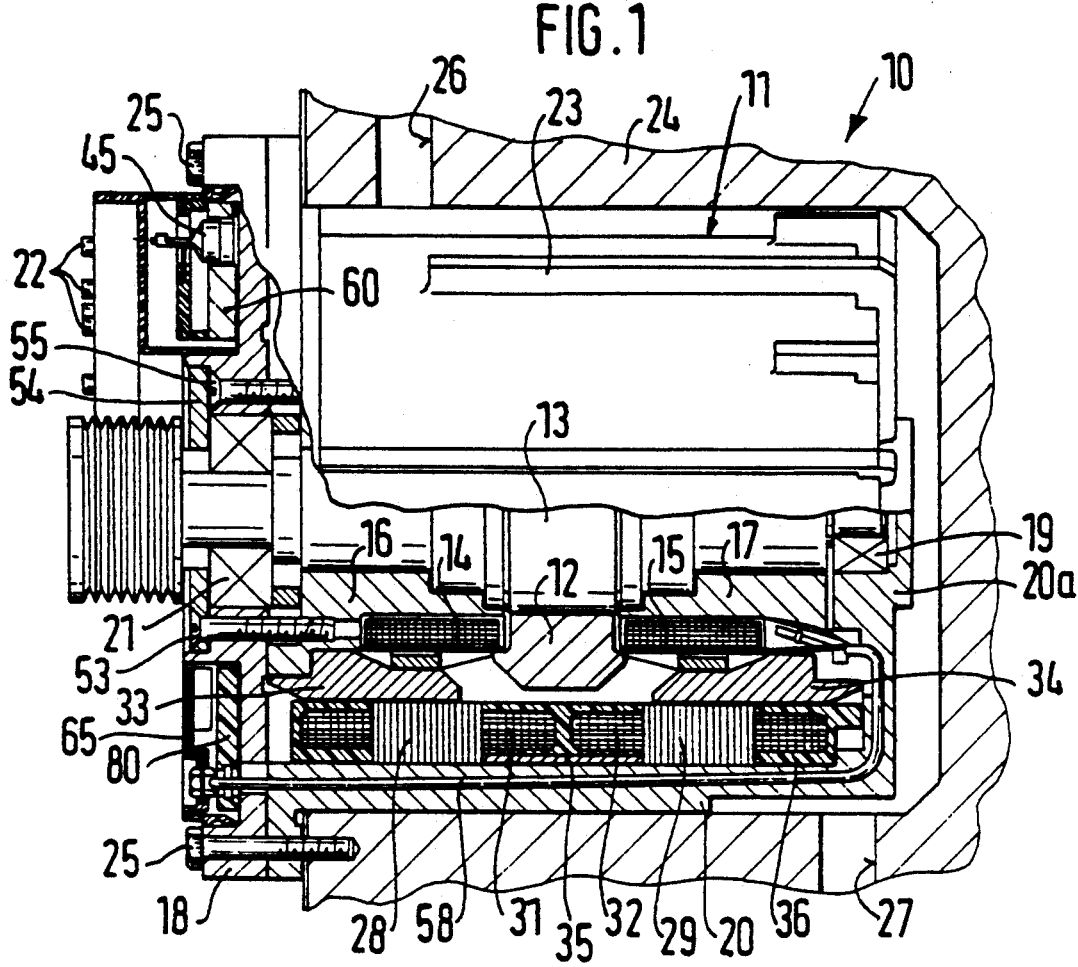
FIG. 1 is a partially side, partially cross-sectional view through a three-phase generator for a motor vehicle according to the invention with two generator systems.

The three-phase generator, designated by 10 in FIG. 1, serves as a power supply for motor vehicles, construction machines and the like. It includes a stator 11, a double-conducting piece rotor 12 in claw-pole construction fastened on a drive shaft 13, and two exciter windings 14, 15 which are arranged on two pole rings 16, 17 and fastened at the stator 11 or at a front bearing cover 18. The rear end of the drive shaft 13 is received in a first ball bearing 19 at the base 20a of a pot-shaped metal housing 20 of the generator 10. The drive shaft 13 is received on the drive side (A-side) via another ball bearing 21 in the bearing cover 18 which closes the metal housing 20 toward the drive side and carries the electrical terminals 22 of the three-phase generator 10 and a rectifier and regulator arrangement which will be discussed in the following. The liquid-cooled three-phase generator is provided outside of the metal housing 20 with spacer ribs 23 serving to guide the coolant and is inserted—as is shown—in a correspondingly constructed pot-shaped recess in the unit 24 of the vehicle and fastened to the latter by screws 25. The coolant is guided to the outer surface of the metal housing 20 via an inlet bore 26 to absorb the heat generated in the generator 10 and to conduct it away into the cooling circuit of the machine via an outlet bore 27.

The stator 11 of the three-phase generator 10 contains two plate stacks 28, 29 which are situated one after the other in the axial direction. Three-phase windings 31, 32 are inserted as so-called stator windings in the slots of the plate stacks 28, 29 and connected with one another in a star connection. The three-phase windings 31, 32 cooperate with the double-conducting piece rotor 12 which has two claw pole systems 33, 34. The two stator plate stacks 28 and 29 are held at a distance from one another by a metal spacer ring 35 and positioned so as to be offset relative to one another by a half slot spacing. They are embedded along with the winding ends of the three-phase windings 31 and 32 in a heat conducting plastic 36 to form a prefabricated constructional unit.

Figure 2:
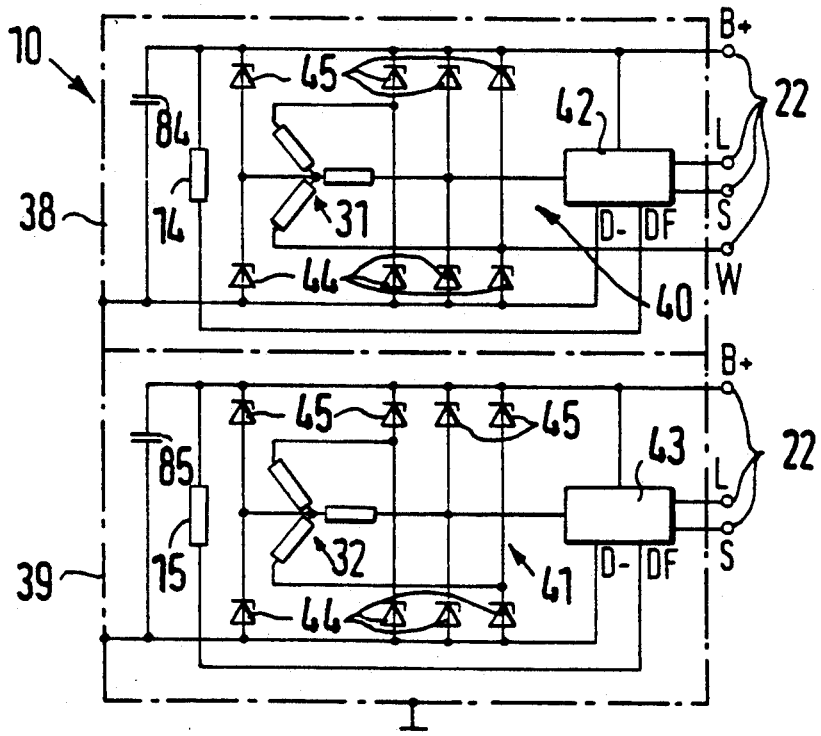
FIG. 2 is a circuit diagram for a generator circuit for the two generator systems.

FIG. 2 shows the electrical connection of the three-phase generator 10 with its two independent three-phase systems 38, 39, with rectifier units 40, 41 and regulator current means 42, 43 and their connection terminals 22 with the standard designations B+, L, S and W. The B+ terminals can be connected in a known manner (EP 0 232 828 A2) to two separate accumulator or storage batteries of 12 Volts each which are optionally connected in parallel or in series, respectively, for 12-Volt or 24-Volt consumers. If desired, a bridge can be produced between the two B+ terminals by an additional metal part inserted in the generator. The metal housing 20 of the three-phase generator 10 is connected to ground in this case so that all negative diodes 44 of the two rectifier units 40, 41 are grounded on the anode side and all positive diodes 45 are connected with the B+ connection terminals 22 on the cathode side. This example corresponds to a circuit with a common negative ground. On the other hand, for a series connection of the individual systems with grounding of the electrical center the negative diodes of one system and the positive diodes of the other system are to be grounded to the housing.

The concrete arrangement and wiring of the rectifier units 40, 41, the regulator circuit means 42, 43 and the three-phase and exciter windings 31, 32 and 14, 15, respectively, at the bearing cover 18 of the three-phase generator 10 will now be explained in more detail hereinbelow with reference to the rest of the drawings.

Figure 3:
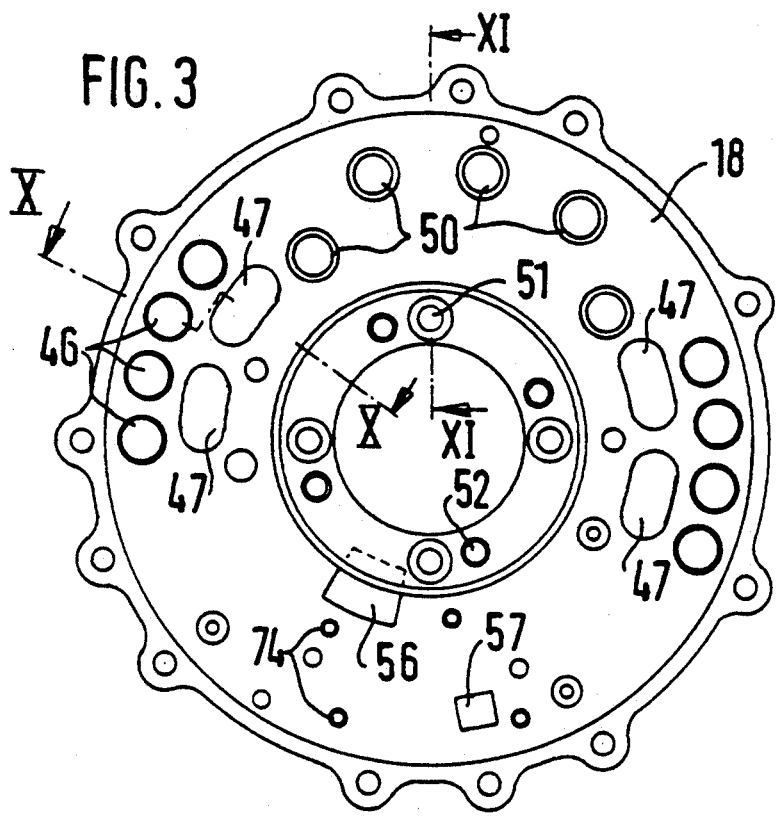
FIG. 3 is a plan view of a bearing cover of the generator shown in FIG. 1.
Figure 12:
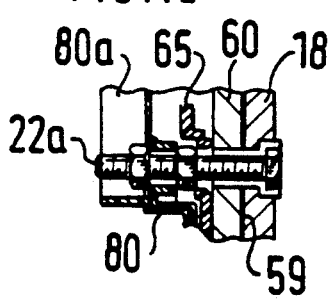
FIG. 12 is a cutaway cross-sectional view through a completely mounted bearing cover at the level of a connection screw.

FIG. 3 shows a front view of the bearing cover 18. It is provided with bore holes 46 for pressing in the negative diodes 44 which are arranged adjacent to one another in two groups of four negative diodes 44 each at the outer edge of the bearing cover 18 according to FIG. 10. Two elongated recesses 47 are arranged further inside in a concentric manner relative to the latter. A collar 48 of the plastic 36 in which the winding ends of the three-phase windings 31, 32 are embedded engages in the recesses 47 according to FIG. 10. The connections of the two three-phase windings 31, 32 are embedded in these four collars 48 in pairs in the form of threaded bushings 49 so as to be protected against corrosion. There are five additional bore holes 50 in the upper portion of the bearing cover 18 in which connection screws 22a are inserted, according to FIG. 12, so as to be insulated. These connection screws 22a form the connection terminals L, S and W according to FIG. 2. Further, there are four bore holes 51, 52 in the bearing region through which the bearing cover 18 is fastened to the pole ring 16 by screws 53 or a bearing cover ring 54 is fastened at the pole ring 16 by screws 55 according to FIG. 1. Cut out portions 56, 57 through which the connection lines 58 (FIG. 1) of an exciter winding 14, 15 are guided are located on the lower half of the bearing cover 18.

Figure 4:
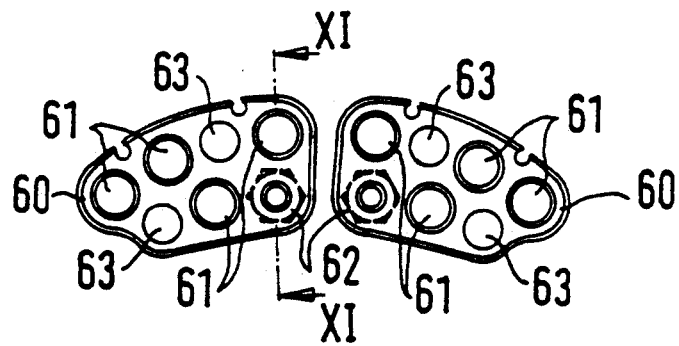
FIG. 4 is a plan view of two heat sinks arranged next to each other from the generator shown in FIG. 1.
Figure 11:
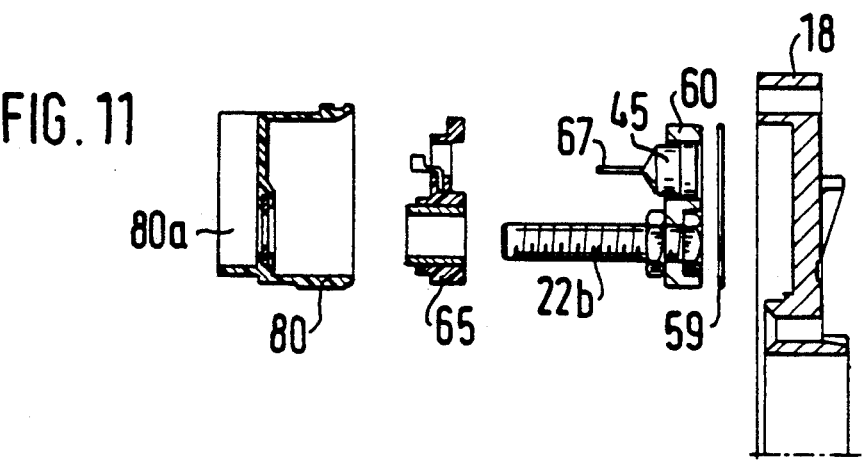

A heat conducting thin annular insulating foil 59 (seen in FIG. 11) is placed on the bearing cover 18 which is prefabricated in this way and two positive heat sinks 60, shown in FIG. 4, are arranged in the upper region of the bearing cover 18. The positive diodes 45 are pressed into four bore holes 61 of the positive heat sinks 60 (FIG. 11) and an additional connection screw 22b, as B+ terminal, is screwed into another correspondingly constructed bore hole 62 with a hexagon recess. Two additional bore holes 63 serve for the fastening of the positive heat sinks 60 on the bearing cover 18 in that two of the connection screws 22a are guided through so as to be insulated according to FIG. 12.

Figure 5:
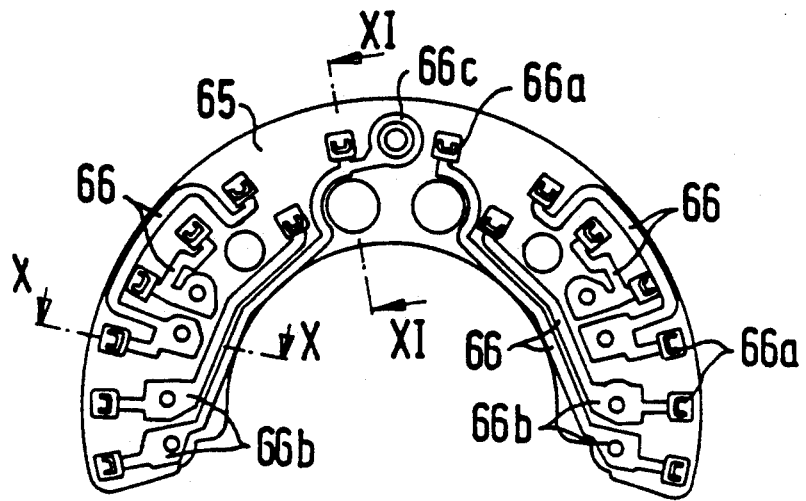
FIG. 5 is a plan view of a busbar or current conductor plate for two rectifier units in the bearing cover shown in FIG. 3.
Figure 10:
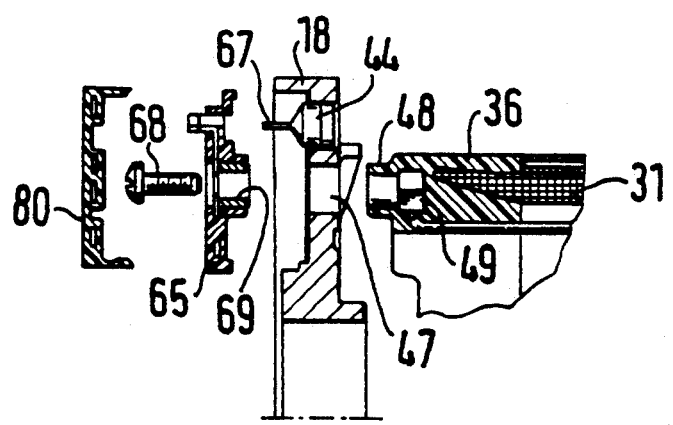
FIGS. 10 and 11 are exploded cutaway cross-sectional views of a portion of the generator shown in FIG. 1 including the stator unit, the bearing cover, positive heat sinks, current conductor plate and current conductor cover prior to assembly taken along the sections lines X—X and XI—XI from FIGS. 3, 4, 5 and 9.

FIG. 5 shows the lower of two printed circuit boards arranged one above the other which is constructed as a current conductor plate 65 and covers the adjacently arranged negative diodes 44 and positive heat sinks 60 with the positive diodes 45 as rectifier units 40, 41 in the shape of a ring segment. The plate 65 contains current conductors 66 which are shown here embedded in transparent insulating material. These current conductors 66 connect the positive and negative diodes 44, 45 with one another in pairs in that the connection pins 67 of the diodes 44, 45 are welded with the claw-shaped ends 66a of the current conductors 66. Moreover, the current conductors 66 are contacted at their regions 66b with the threaded bushings 49 of a phase of the three-phase windings 31, 32 by screws 68 and metal sleeve 69 (FIG. 10).

Figure 6:
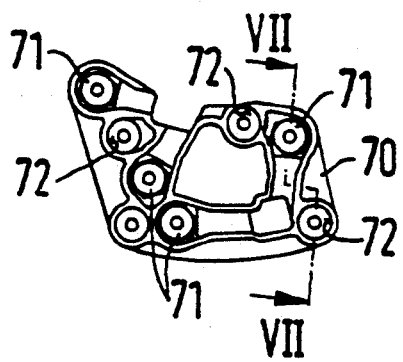
FIG. 6 is a plan view of a connection plate for exciter windings on the bearing cover of FIG. 3.
Figure 7:
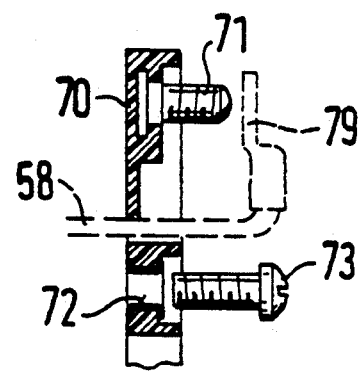
FIG. 7 is a detailed cross-sectional view through the conduction plate of FIG. 6 taken along the section line VII—VII of FIG. 6.

In region 66c one of the conductor paths 66 is contacted by the connection screw 22a for the W-connection terminal of the machine. FIGS. 6 and 7 show a connection plate 70 which is injected molded from insulating material and arranged in the lower region of the bearing cover 18. Four threaded bolts 71 for the ends 79 of the connection lines 58—as indicated in dashes—of the two exciter windings 14, 15 are anchored in the connection plate 70. The connection plate 70 is fastened by screws 73 in threaded bore holes 74 at the bearing cover 18 via four countersunk bore holes 72.

Figure 8:
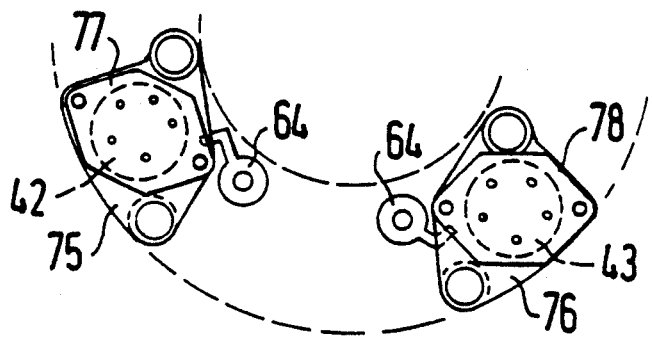
FIG. 8 is a plan view of two regulator means mounted on the bearing cover spaced from each other.

FIG. 8 shows two regulator units arranged at a distance from one another on the lower half of the bearing cover in the contour indicated in dashed lines so that there is space for the connection plate 70 between them. They are situated adjacent to the rectifier unit associated with them, i.e. below the negative diodes 44. The regulator circuit means 42, 43 are inserted in a recess of a cooling plate 75, 76 and riveted to the latter via a base plate 77, 78. The two cooling plates 75, 76 lie immediately above the insulating foil 59 on the bearing cover 18 so that the heat losses developing in the regulator circuit means 42, 43 can be guided off via the bearing cover 18. A DF-connection 64 of the regulator circuit means 42, 43 is welded at the regulator housing and is contacted by an exciter winding terminal during assembly via a threaded bolt 71 in each instance.

Figure 9:
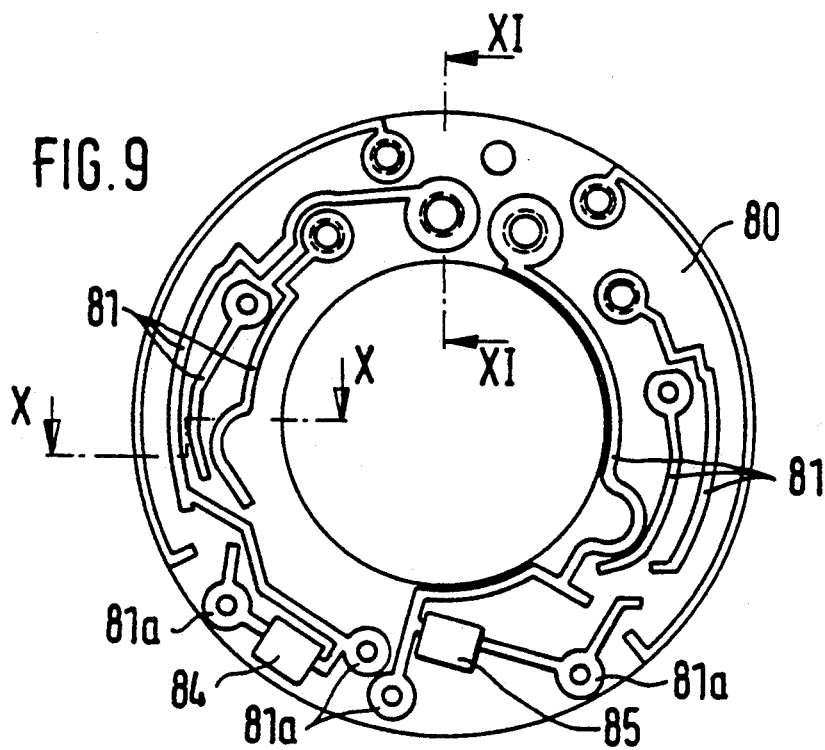
FIG. 9 is a plan view of a current conductor cover to be mounted on the bearing cover of FIG. 3.

FIG. 9 shows the upper of the two printed circuit boards arranged one above the other which is constructed as a current conductor cover 80. Current conductors 81 which are visible in FIG. 9 are embedded in the plastic of the current conductor cover 80. The connection screws 22a and 22b of the machine connections B+, L and S are to be electrically connected with the corresponding connections of the regulator circuit means 42, 43 via these current conductors 81. Since the connection plate 70 (FIGS. 6 and 7) between the two regulator circuit means 42, 43 is screwed on the bearing cover 18, the connection lines 58 of the exciter windings 14, 15 are also contacted via the threaded bolts 71 at the end regions 81a of one of the current conductors 81 and connected with the corresponding connection pins 82 of the regulator circuit means 42, 43 via these current conductors 81.

Figure 13:
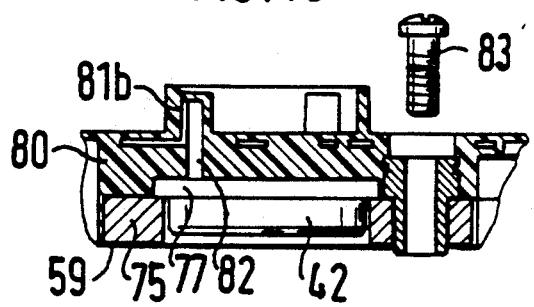
FIG. 13 is a detailed cross-sectional view of the current conductor cover of FIG. 9 with the integrated regulator means of FIG. 8.

FIG. 13 shows that the regulator circuit means 42, 43 are first welded with the respective ends 81b of the current conductors 81 before the latter have been embedded in the plastic of the current conductor cover 80. In so doing, each B+ connection of the two three-phase systems 38, 39 is electrically connected via one of the current conductors 81 with a connection of the exciter windings 14, 15 and with the B+ connection of the respective regulator circuit means 42, 43. The two regulator circuit means 42, 43 are fixed by their cooling plates 75, 76 at the current conductor cover 80 which is screwed to the bearing cover 18 via screws 83 in the lower region and by the connection screws 22a and 22b in the upper region. Moreover, a capacitor 84, 85 for each of the two regulator circuit means 42, 43 is cast in the current conductor cover 80 and connected via the current conductors 81 between a B+ and D- connection of the regulator circuit means 42, 43 associated with it. One of the connections is screwed to the bearing cover 18 by a screw 83 according to FIG. 14 and accordingly grounded, while the other connection is contacted with a connection line of the corresponding exciter winding.

Figure 14:
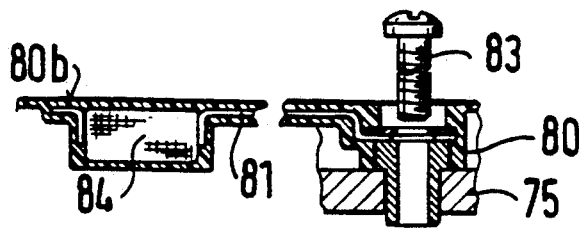
FIG. 14 is a detailed cross-sectional view of another portion of the current conductor cover in the vicinity of the capacitor.

FIGS. 1 and 9 to 11 show that the current conductor cover 80 is constructed in an annular shape as the upper of the two printed circuit boards which are arranged one above the other and covers the semicircular current conductor plate 65 as well as the regulator circuit means 42, 43 and the connection plate 70 with the connection ends of the exciter windings 14, 15. Further, it can be seen from these drawings that the bearing cover 18 receives the connections 49 of the three-phase windings 31, 32 and the connection ends 79 of the exciter windings 14, 15 and that these connections are electrically connected with the rectifier units 40, 41 of negative and positive diodes 44, 45 arranged on the bearing cover 18 as well as with the regulator circuit means 42, 43 and the connection terminals 22 of the machine via the current conductors 66, 81 embedded in the insulating material. Finally, the connections of the three-phase windings and exciter windings and the rectifier units and regulator switches are covered externally by the current conductor cover 80 fastened to the bearing cover 18. The connection screws 22a and 22b are grasped by a collar 80a of the current conductor cover 80. It is advisable for the purpose of shielding against electromagnetic disturbances that at least one of the two surfaces, preferably the outer surface of the current conductor cover 80—as indicated in FIG. 14—be provided with an electrically conductive layer 80b and that the latter be connected with the housing 20 as electrical ground.

While the invention has been illustrated and embodied in an electric machine, preferably a rotary current generator for vehicles, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. Electric machine for vehicles, said electric machine having a drive side and comprising a plurality of connection terminals; a pot-shaped metal housing having a base; a bearing cover closing the pot-shaped housing on the drive side; a drive shaft supported at one end thereof in the base of the pot-shaped housing and on another end in the bearing cover; two stator plate stacks spaced from each other axially in the pot-shaped metal housing, said stator plate stacks each being provided with a slot; two three-phase windings, each of the three-phase windings having an exciter winding, the three-phase windings being inserted in the slots of the stator plate stacks, said three-phase windings having electrical connection means received in the bearing cover and said exciter windings having electrical connection means received in the bearing cover; two circumferentially extending claw pole rotors fastened to the drive shaft; rectifier units comprising negative and positive diodes in the bearing cover; and regulator means on the bearing cover, wherein said electrical connection means of the exciter and three-phase windings are electrically connected with the rectifier units, connection terminals and the regulator means on the bearing cover.

2. Electrical machine as defined in claim 1, further comprising a thermally conductive and electrically insulating positive heat sink fastened to the bearing cover, and wherein the negative diodes of the rectifier units are pressed into the bearing cover and the positive diodes are pressed into the positive heat sink and further comprising at least one printed circuit board fastened to the bearing cover so as to cover the negative diodes, the positive diodes and the positive heat sink externally, said at least one printed circuit board having conductor paths and making electrical connection with the electrical connection means of the three-phase windings and the exciter windings, with the connection terminals and with the regulator means.

3. Electric machine as defined in claim 3, wherein the electrical connection means of each of the three-phase windings is arranged at one of the rectifier units on the bearing cover, each of said rectifier units comprising the negative and positive diodes and being separated from each other electrically, and wherein the electrical connection means of each of the exciter windings are arranged at one of the regulator means on the bearing cover, said regulator means being separated from each other electrically, and wherein said connection terminals are electrically separated from each other, the bearing cover being provided with bore holes to receive the negative diodes and the positive heat sink being provided with bore holes to receive the positive diodes.

4. Electric machine as defined in claim 1, further comprising a heat conducting plastic enclosing the three-phase windings and threaded bushings in collars of the heat conducting plastic, each of said collars being engaged in a recess of the bearing cover and said electrical connection means of said two three-phase windings being combined in the threaded bushings.

5. Electric machine as defined in claim 1, further comprising a thermally conducting and electrically insulating cooling plate on the bearing cover for each of the two regulator means, and wherein each of the two regulator means is located adjacent one of the rectifier units on one of the two cooling plates.

6. Electric machine as defined in claim 5, further comprising a connection plate having threaded bolts for each of the electrical connection means of the two exciter windings and made of insulating material, and connection plate being fastened to the bearing cover between the two cooling plates and said threaded bolts being electrically connected via the conductor paths of the at least one printed circuit board with the regulator means.

7. Electric machine as defined in claim 2, wherein the positive heat sinks are arranged adjacent one another on the bearing cover and each of the positive heat sinks has a connection screw acting as B+ connection terminal, said B+ connection terminal being electrically connected via the at least one printed circuit boards with the electrical connection means of one of the exciter windings and with the regulator means.

8. Electric machine as defined in claim 2, including two of the printed circuit boards, each of the printed circuit boards being arranged one above the other, one of said printed circuit boards consisting of a current conductor plate covering the two rectifier units adjacent each other and each containing current conductors connecting the positive and negative diodes of the rectifier units with one another in pairs and with the three-phase windings.

9. Electric machine as defined in claim 8, wherein another of said printed circuit boards covers the printed circuit board consisting of the conductor plate and consists of a current conductor cover covering the current conductor plate, the regulator means and the connection plate with the electrical connection means of the exciter windings, said other printed circuit board containing current conductors connecting the regulator means with the connection terminals and with the electrical connection means of the exciter winding.

10. Electrical machine as defined in claim 9, wherein the two regulator means are fastened to the current conductor cover by the cooling plates.

11. Electric machine as defined in claim 10, wherein each of the connection terminals comprises a connection screw and each of the connection screws other than the connection screws for the B+ and W− connection terminals are inserted in the bearing cover so as to be insulated and connected electrically via the current conductors of the current conductor cover to the regulator means.

12. Electric machine as defined in claim 9, further comprising a capacitor for each of the two regulator means, said capacitor being cast in the current conductor cover and connected electrically via the current conductors of the current conductor cover between a B+ and D− connector of the regulator means.

13. Electric machine as defined in claim 8, wherein one of two surfaces of the current conductor cover is provided with a conductive layer and the conductive layer is electrically connected with a ground.

14. Electric machine for vehicles, said electric machine having a drive side and comprising a plurality of connection terminals; a pot-shaped metal housing having a base; a bearing cover closing the pot-shaped housing on the drive side; a drive shaft supported at one end thereof in the base of the pot-shaped housing and on another end in the bearing cover; two stator plate stacks spaced from each other axially in the pot-shaped metal housing, said stator plate stacks each being provided with a slot; two three-phase windings, each of the three-phase windings having an exciter winding, the three-phase windings being inserted in the slots of the stator plate stacks, said three-phase windings having electrical connection means received in the bearing cover and said exciter windings having electrical connection means received in the bearing cover; a connection plate connected with the electrical connection means of the two exciter windings and fastened to the bearing cover; two circumferentially extending claw pole rotors fastened to the drive shaft; rectifier units comprising negative and positive diodes in the bearing cover; and regulator means on the bearing cover, wherein said electrical connection means of the exciter and three-phase windings are electrically connected with the rectifier units, connection terminals and the regulator means on the bearing cover.

* * * * *